Oct. 18, 1966     E. B. NICHOLS     3,279,507

WOOD-TURNING COMPOUND CHISEL

Filed May 14, 1962

*INVENTOR.*
EDGAR B. NICHOLS
BY
Pennie, Edmonds, Morton, Barrows & Taylor
ATTORNEYS

United States Patent Office 3,279,507
Patented Oct. 18, 1966

3,279,507
WOOD-TURNING COMPOUND CHISEL
Edgar B. Nichols, 325 W. Main St., Moorestown, N.J.
Filed May 14, 1962, Ser. No. 194,252
1 Claim. (Cl. 142—56)

This invention relates to woodworking tools and has for its object the provision of a special tool for shaping bowling pins to provide a seat for a reinforcing band at its midportion.

The bowling pin in the making of which my new tool is used is disclosed in my pending application Serial No. 608,036, filed September 5, 1956, and now Patent Number 3,159,402, dated December 1, 1964, and will be hereinafter described. In the making of the pin a groove about two and a half inches wide and a fraction of an inch deep is formed around the midportion of the pin, the bottom of the groove being curved to approximately the same convexity as the midportion of the pin before the groove is formed.

Prior to the invention of this application the grooves were cut in a conventional turning lathe but the process is time consuming and grooves of exact dimensions are not always obtained.

The object of this invention is to provide a special tool for use in conventional turning lathes which will, in a single movement of the tool across the pin, cut a groove of the desired contour which is precisely accurate in shape and dimensions.

In the accompanying drawings I have shown two forms of my improved tool, and in the said drawings.

Figure 1:
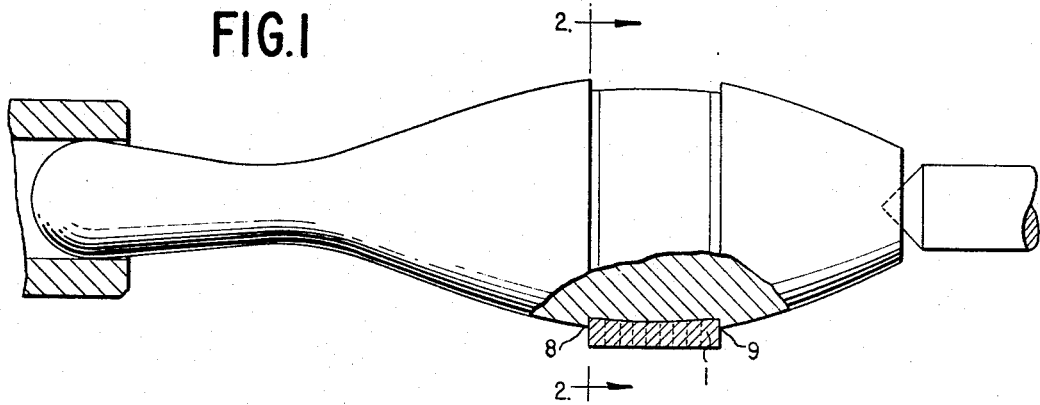
FIG. 1 is a side elevation, partly in section showing a pin in the lathe at the completion of the cut.
Figure 2:
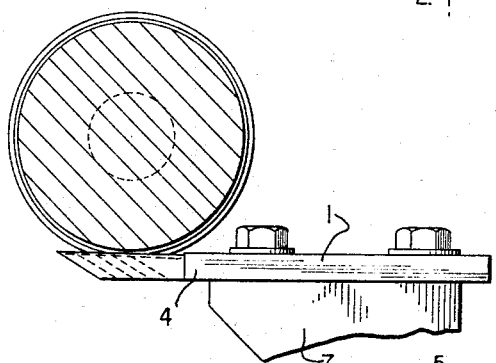
FIG. 2 is a section on line 2—2 of FIG. 1.
Figure 5:
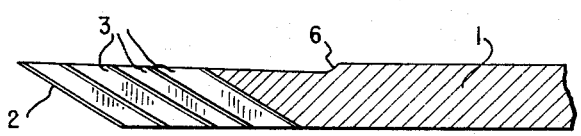
FIG. 5 is a section on line 5—5 of FIG. 4.

Referring to the drawings, and particularly to FIG. 1, 1 indicates the body of the tool which is of rectangular cross-section and of a width equal to the width of the groove to be cut. The cutting edge 2 of the tool is made up of a series of separate steps or teeth 3 here shown as nine in number. The cutting edges of the teeth are all substantially parallel with a transverse plane at right angles to the side faces 4 and 5 of the tool, but all the cutting edges except the middle one are inclined slightly to such plane, as shown in FIG. 5. Also the successive separate edges from the ends of the total cutting edge toward the middle are spaced a slightly greater distance from the plane of the top face 4 of the tool and also from the forward end of the tool. Otherwise stated, there is a transverse shoulder 6 on the upper face of the tool back of the cutting edge and the upper face of the tool slopes upwardly from this shoulder to the cutting edge, as shown particularly in FIG. 5.

As is customary in tools of this type the edges of the tool are at an angle of about 5° to the median vertical plane of the tool so that the tool is wider at the cutting edges than at any point back of the cutting edges.

Figure 3:
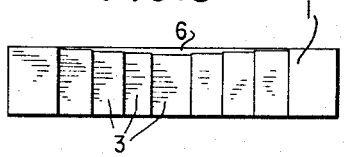
FIG. 3 is an end view of the tool on an enlarged scale.
Figure 4:
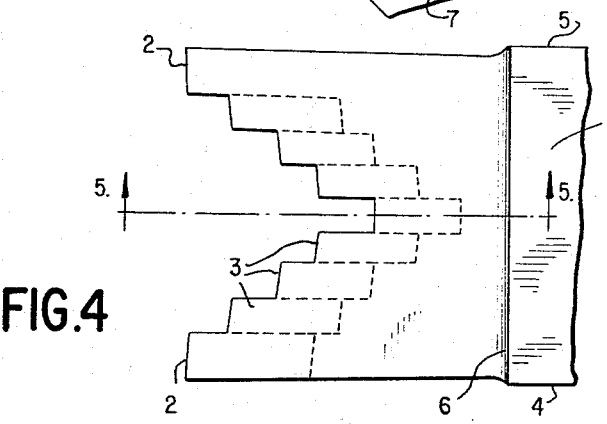
FIG. 4 is a plan view of the tool on the same scale as FIG. 3.

In operation the pin is secured in the chuck of the lathe and the tool is attached to the tool holder 7 with its upper face parallel to and beneath the axis of the pin. The tool holder is mounted for movement in a direction at right angles to the axis of the pin. The tool holder is adjusted to the proper height to cut a groove of the desired depth and then moves across the lathe bed until the cutting edge at the middle of the tool is beyond the vertical plane of the axis of the pin. During this movement of the tool, a groove of the contour shown in FIG. 3 will be cut around the midportion of the pin. That is to say, the bottom of the groove is convex but instead of being a continuous curved surface is formed of successive narrow rings each having a surface which is flat in its axial direction. The surface of the ring at the middle of the groove is parallel with the axis of the pin. The surfaces of the other rings are inclinded at a slight angle to the surface of the middle ring. That is to say, the diameter of the pin is the same throughout the width of the middle ring, but the diameter of the pin is slightly greater at the edge of other rings nearer the middle ring than at their other edge.

As described in my above-mentioned pending application, the wood at the bottom of the groove is compacted to reduce the axial convexity so that the surfaces between the shoulders 8 and 9 at the ends of the groove is cylindrical. After this impacting operation the pins are identical with the pins previously grooved by hand and wherein the surface before the compacting step was continuously curved in both directions.

It will be noted that all surfaces of the portion of the tool in front of the shoulder 6 are flat and that the entire area of the top surface in front of the shoulder is at the same angle to the surface back of the shoulder. The same is true of the side edges of the tool. Also, the undersurface of each tooth is at the same angle to the bottom face of the tool. This greatly facilitates the accurate shaping and sharpening of the tool. Also, only two teeth are cutting at any one time to break up the chips so that there is no tendency of the total cut to follow the grain of the wood.

It is important that the distance between the shoulders at each end of the groove be exact within very narrow tolerances, as in the manufacture of the pins the nylon bands are molded to exact dimensions and must fit snugly in the groove. By cutting the groove at one operation, the groove is always the exact width of the tool.

Figure 6:
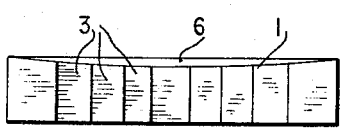
FIGS. 6 and 7 are detail views showing a modification of my improved tool.
Figure 7:
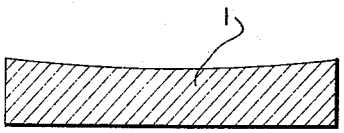

In FIGS. 6 and 7, I have shown a tool of somewhat modified shape. In the tool here shown the upper face of the tool between the shoulder 6 and the cutting edge, instead of being flat and inclined slightly downwardly from the cutting edge to the shoulder 6 as in the tool above described, is concave on a curve corresponding to the longitudinal curvature of the midportion of the pin. By so shaping this portion of the upper surface of the tool before the cutting edges are formed, which can be easily done on a milling machine, the short cutting edges when formed will be curved instead of straight and although staggered longitudinally will cut a shallow groove circumferentially of the pin with a continuously convex surface between the shoulders of the groove.

When the surface of the wood between the shoulders of the groove is to be compacted to a true cylindrical surface, the tool of the first-described form is satisfactory and has the advantage that the short cutting edges being straight are more easily sharpened, but where a continuous smooth curved surface is desired, the tool of FIGS. 6 and 7 should be used.

My improved tool is described as designed for cutting grooves around the midportion of bowling pins, but it can be used for grooving any billet or circular cross-section.

I claim:

A lathe tool for cutting a wide groove around a billet of circular cross-section, consisting of an elongated flat bar having a cutting edge at one end, said bar at the cutting edge being the exact width of the groove to be cut, said cutting edge comprising a narrow portion at the outer edges of the bar and substantially perpendicular thereto and a series of like portions set back successively from the portions at the edge to the middle of the bar, the cutting edge being located at the upper surface of the bar, said bar being slightly inclined downwardly and rearwardly from the cutting edge throughout the work contacting portion of the tool, said work contacting surface being generally concave about an axis line parallel to the axis of the elongated bar.

References Cited by the Examiner

UNITED STATES PATENTS

| | | | |
|---|---|---|---|
| 419,873 | 1/1890 | Palmer | 142—56 |
| 525,982 | 9/1894 | Heuser | 142—43 |
| 597,020 | 1/1898 | Potter | 145—24 |
| 629,813 | 8/1899 | Philbrick. | |
| 652,130 | 6/1900 | Miller et al. | 142—43 |
| 676,123 | 6/1901 | Carter | 142—43 |
| 2,502,922 | 4/1950 | Bura | 144—241 |
| 3,063,485 | 11/1962 | Dosker | 144—2 X |

FOREIGN PATENTS

| | | |
|---|---|---|
| Ad. 39,012 | 6/1931 | France. |
| 2,065 | 5/1879 | Great Britain. |
| 15,274 | 6/1910 | Great Britain. |

HAROLD D. WHITEHEAD, *Primary Examiner.*

EARL EMSHWILLER, WILLIAM W. DYER, JR.,
*Examiners.*